(12) United States Patent
Nolting

(10) Patent No.: US 6,718,308 B1
(45) Date of Patent: Apr. 6, 2004

(54) MEDIA PRESENTATION SYSTEM CONTROLLED BY VOICE TO TEXT COMMANDS

(76) Inventor: Daniel L. Nolting, 194-192 Peck Ave., Westhaven, CT (US) 06516

( * ) Notice: Subject to any disclaimer, the term of this patent is extended or adjusted under 35 U.S.C. 154(b) by 843 days.

(21) Appl. No.: 09/611,782

(22) Filed: Jul. 7, 2000

Related U.S. Application Data

(60) Provisional application No. 60/184,139, filed on Feb. 22, 2000.

(51) Int. Cl.[7] ................................................ G10L 15/08
(52) U.S. Cl. ...................................... 704/275; 345/728
(58) Field of Search ............................... 704/275, 270, 704/270.1; 345/731, 728

(56) References Cited

U.S. PATENT DOCUMENTS

| | | | |
|---|---|---|---|
| 4,677,569 A | | 6/1987 | Nakano et al. |
| 4,704,696 A | | 11/1987 | Reimer et al. |
| 4,776,016 A | | 10/1988 | Hansen |
| 4,984,177 A | | 1/1991 | Rondel et al. |
| 5,345,538 A | | 9/1994 | Narayannan et al. |
| 5,473,744 A | * | 12/1995 | Allen et al. ............... 715/500.1 |
| 5,732,216 A | * | 3/1998 | Logan et al. ............... 709/203 |
| 5,742,283 A | * | 4/1998 | Kim ......................... 715/500.1 |
| 5,890,122 A | | 3/1999 | Van Kleeck et al. |
| 5,890,123 A | | 3/1999 | Brown et al. |
| 5,903,870 A | * | 5/1999 | Kaufman ................... 704/275 |
| 5,933,807 A | | 8/1999 | Fukuzawa |
| 5,970,460 A | | 10/1999 | Bunce et al. |
| 5,974,384 A | | 10/1999 | Yasuda |
| 5,974,385 A | | 10/1999 | Ponting et al. |
| 6,081,262 A | * | 6/2000 | Gill et al. ................ 715/500.1 |
| 6,091,408 A | * | 7/2000 | Treibitz et al. ............. 345/753 |
| 6,301,586 B1 | * | 10/2001 | Yang et al. ............... 707/104.1 |

* cited by examiner

*Primary Examiner*—Vijay Chawan
*Assistant Examiner*—Donald L. Storm
(74) *Attorney, Agent, or Firm*—McKay B Associates, PC

(57) ABSTRACT

A system and method for searching, assembling, and manipulating a variety of multi-media using voice converted to text commands. Digital images, movies, audio, or text is verbally searched and retrieved from a variety of video and audio databases using a combination of directional commands and a means for juxtaposing and assembling search results. The desired media is then placed onto a platform means for manipulating and editing the media files. Any retrieved media files and/or images can be manipulated and assembled on-screen using commands such as "zoom" or "move left" by having corners and borders read by the grid of the platform means. The image(s) are also capable of being stacked, or overlay one another to define re-proportioned backgrounds. The image(s) from the platform means are displayed without the grid using an image platter as a means of providing a preliminary view of the presentation prior to projection. The system allows for the hand-free assembly and editing of music and movies, and provides a means for verbally assembling pre-planned or impromptu presentations comprising video or audio clips, digital images, or text retrieved from multiple local and remote databases, such as a DVD movie-base or the World Wide Web.

34 Claims, 8 Drawing Sheets

FIG. 9
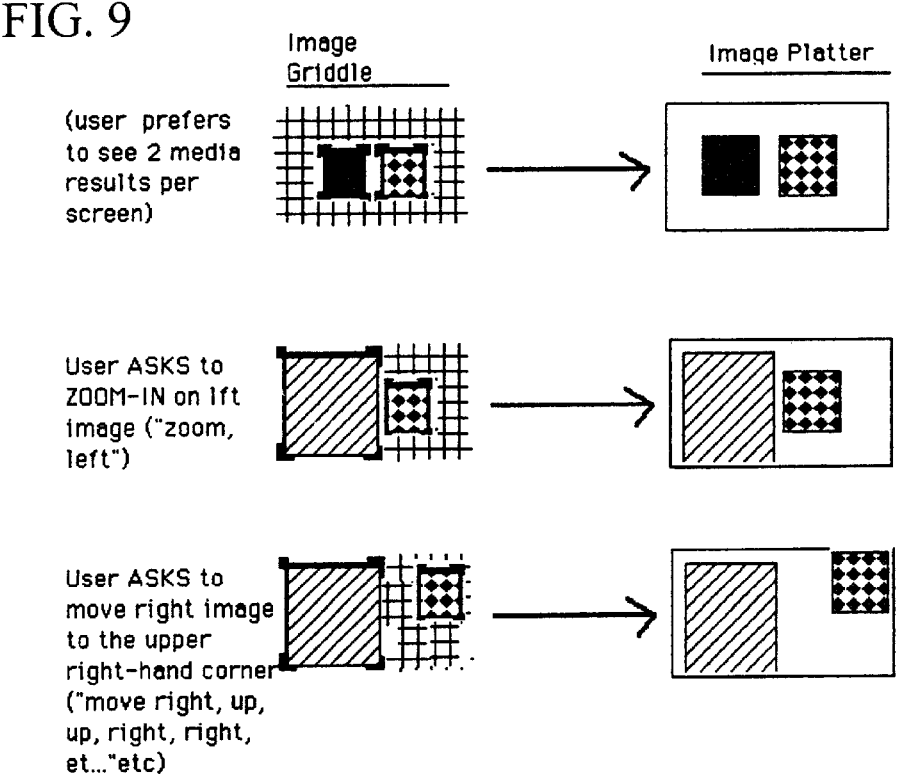
FIG. 10
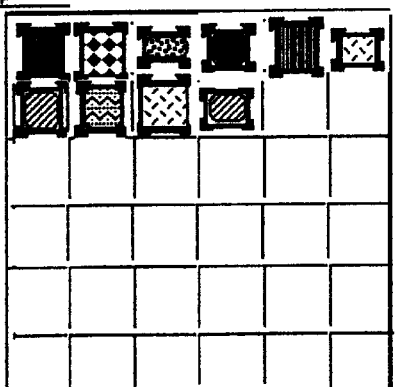
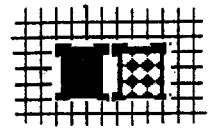

MEDIA PRESENTATION SYSTEM CONTROLLED BY VOICE TO TEXT COMMANDS

SPECIFIC REFERENCE

Applicant hereby claims benefit of priority date so established by provisional application Ser. No. 60/184,139, filed Feb. 22, 2000.

BACKGROUND

1. Field of the Invention

The present invention relates to the manipulation, navigation, and assemblage of multimedia using voice commands to allow for remote assembly and display of images during projected presentations, by combining pre-existing computer programs with original computer programs and electronic circuitry. In particular, a method and apparatus as further described allows voice commands to operate impromptu juxtapositioning and displaying of various forms of data onto a presentation screen. The display can either be immediately recorded for a subsequent presentation or incorporated into an active presentation of movies, still images, text, and sound. Submitted utterances go through a series of conversional and identification filters (based on pre-set user preferences), which automatically search, scrutinize, and capture from pre-selected databases (local or remote), on-line commercial media vendors, and/or the World Wide Web (WWW). The speaker then sees instantaneous results and can either submit those results to a large display, modify the search, or juxtapose the results to fit desired projected output.

2. Description of the Related Art

Known in the art is the use of voice commands for voice-to-text conversion of language utterances with preferred words stored in a modifiable word bank. A voice recognition module working in conjunction with a computer and utilizing a microphone as an input device allows for the display of translated language on the computer screen. See U.S. Pat. No. 4,984,177 (Rondel et al.).

More recently, the use of voice recognition has been implemented for the navigation of application programs being utilized by a single operating system. As seen, for example, in U.S. Pat. No. 5,890,122 to Van Kleeck et al., a method and system is described for an application program to receive voice commands as an input facility for the navigation and display of drop-down menus listing available commands for the application. The available commands can be modified as preferred by the user allowing the list to be made variable.

The navigation through applications utilizing "windows", or graphical interfaces of a portion of a screen that can contain its own document, is also demonstrated by U.S. Pat. No. 5,974,384 to Yasuda. Again, these systems demonstrate the use of the voice recognition module accompanying a computer system employing a particular operating system. The software or hardware works in close relationship with the operating system allowing the voice recognition process in the system to provide a signal resulting from the executed voice input. What is desired, however, is not just a means of navigation through a single application being used on a computer using voice command utilities, but a unit that allows access to separate database to provide hands-free navigation through variable output facilities.

The navigation of displays outside the field of text and graphical user interfaces using voice technology is evident in its implementation for the World Wide Web (WWW). In U.S. Pat. No. 5,890,123 to Brown et al., a system and method is disclosed for a voice controlled video screen display wherein the data links of a web page are utilized by speech recognition, thereby allowing the navigation of the WWW by voice command. The software program in this application is a web browser. Though a web browser may be utilized by a variety of operating systems, the displays retrievable are made accessible only through entry into a global network, and the "hands-free" navigation can only be accomplished by the displayed links particular for the web page. The present invention demonstrates the assembly, manipulation, and navigation of digital displays beyond those simply comprising displays produced by Hypertext Markup Language (HTML) on the World Wide Web. This system and method will also teach, not only the navigation of text and graphical interfaces, but also the manipulation and assembling of various types of on-screen-digital displays and multimedia, retrievable and searchable from variable databases.

Multimedia as it is used for presentation purposes covers a wide range of displays, both audio and visual. A cohesive organization of these displays is paramount when presenting the images on a screen. There are currently graphics and recording programs that can provide voice-command manipulation of images. However, there is no graphics program that allows easy and precise manipulation, of non-graphics experts and voice functioning systems, which benefit the product-as-a-whole, without re-structuring it to accommodate the varying degrees of inputs and outputs. The art of "hands-free" manipulation of digital images, such as still pictures or movies, and sound objects is limited. U.S. Pat. No. 5,933,807 to Fukuzawa shows how a displayed picture can be manipulated by a generated sound signal. A major limitation exists in that the arrangement and display of the images occurs within a single screen in that prior art.

For instance, an example that exemplifies the need for the present system and method is one in which a doctor in an operating room conducting a complex procedure requires a recent X-ray, which can be called-up immediately. Or, for example, an auto mechanic, who is following a procedure from images in an on-line manual, requires an immediate visual comparison to an older part and needs to perform this action without taking his/her hands off of the tool being held in place. Lastly, there may be envisioned a speaker who, during a business presentation, impresses the clientele by visually addressing tough questions answered by a simple vocal query through a pre-constructed local database.

Thus, there is a need for a system that provides "hands-free" navigation, manipulation, and assembly of a variety of multimedia, which is accomplished remotely for the purposes of presentation on various screens. The present invention can assemble searched text and images from variable databases, and allow a user to record, juxtapose, and manipulate image displays either impromptu or pre-planned.

SUMMARY OF THE INVENTION

Combined with external and internal computer components, and internal software programs, this system comprises a unit that enables any user to vocally assemble and display (individually or in a series) still images, movie-clips, feature-length movies, feature-length audio presentations, short audio-clips, text, or any combination of the aforementioned without any concern of media type. The system can also, through verbal command, "free-float" the placement of any visual image, including any nonrectangular forms, transparent images, or text, onto a background image or similar image that concurrently becomes the background image. Lengthy presentations (still-image, movie, or audio or a combination) can also be automatically re-configured to fit into pre-assigned time frames that previously, would have had to of been disrupted due to sporadic pauses caused by the typical external human intervention. The option to record—with or without the original verbatim search query—into video/audio playback and/or text-computer readable language for future reference also exists.

An inputted voice utterance is converted by voice recognition means into computer-readable text in the form of a command. The commands are categorized as "search", "manipulation", and "navigation", each of which comprise other commands that are triggered in succession by directionals, which are a means for triggering the commands separately or simultaneously.

The means necessary for performing and directing the commands include a series of EDSP filters, which are search and image capturing commands that contain therein a series of "media reader" directionals. The EDSP filters are used as a means for taking the converted search command, identifying relevant database(s), committing the search, and retrieving results by conducting multiple-page "plane" searches for compatible media. The filtering means then transfers matching data into a means for juxtapositioning or displaying search results, termed herein as the "image negotiator".

The juxtapositioning means, or image negotiator, which includes an "un-latcher", a "bordershop", and a "cornershop", prepares the image for presentation by way of the "image griddle". The image griddle is a platform wherein a means is provided for the desired media to be manipulated and organized for display. The media may be organized as a table within the image negotiator wherefrom a hanging command issued to the image griddle is provided as a means for allowing the desired images to be placed and grouped according to user preferences into the image griddle. A "shrouder" is used as a command means for overlaying images.

It is the objective of the present invention to allow voice commands to operate impromptu juxtapositioning and display of various forms of data onto presentation screens, thereby allowing for an active and remotely assembled concise visual and audio presentation.

It is further an objective of the present invention to allow for the on-screen manipulation of images using voice-command, whereby images, tables, and other multimedia clips are maneuvered and managed freely, within active borders and corners.

It is further an objective of the present invention to allow an image or text to free-float onto another background image, thereby motivating any change in graphic conversion and presentation.

It is further an objective of the present invention to provide the option to record video/audio playback and/or stored search queries.

BRIEF DESCRIPTION OF THE DRAWINGS

FIG. 9 illustrates the use of a verbal command used as part of the manipulation of an image.

FIG. 10 illustrates the organization of voice-assembled and searched image results capable of manipulation.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated figures, and such further applications of the principles of the invention illustrated herein, as would normally occur to persons skilled in the art to which the invention relates.

Figure 1:
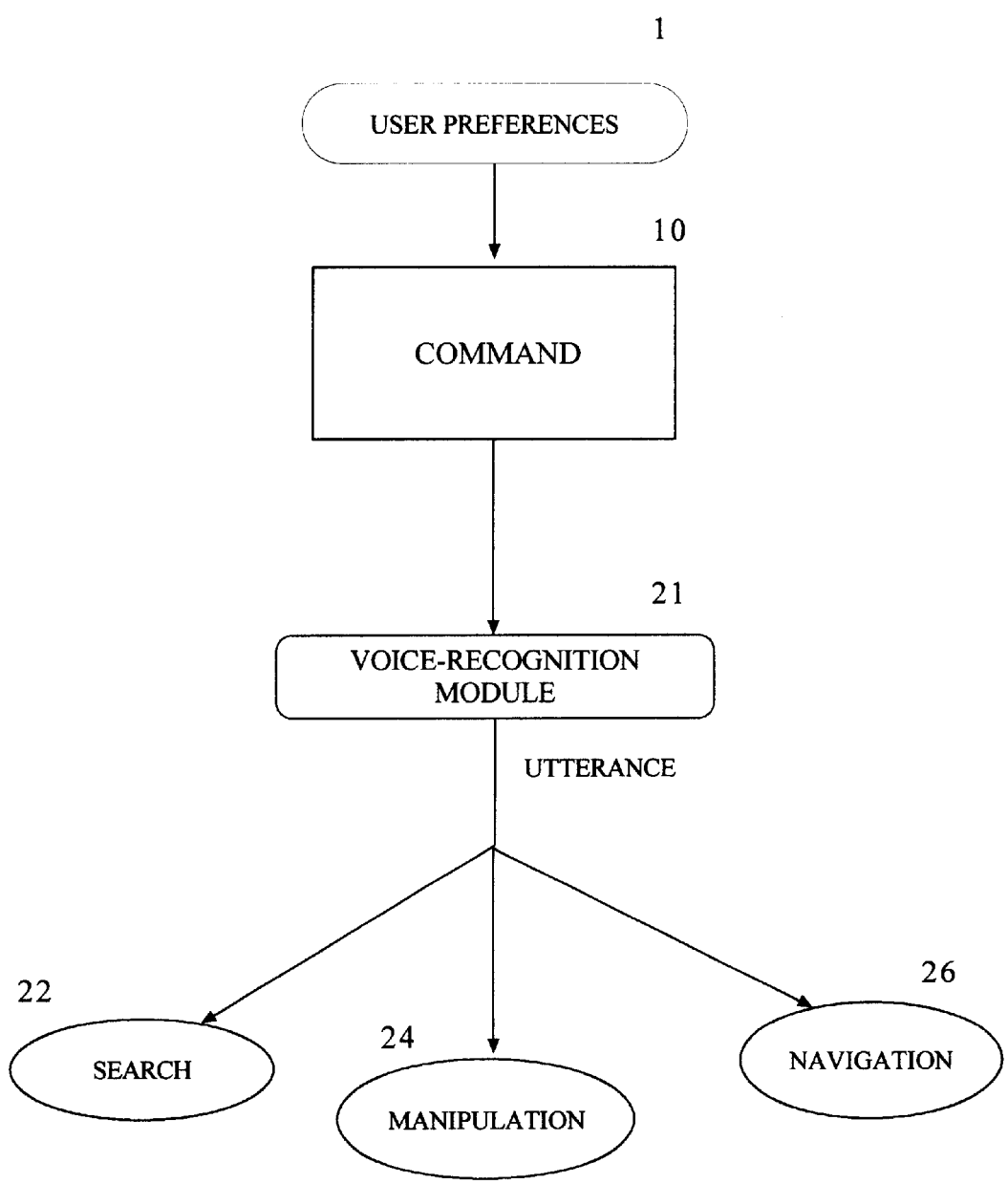
FIG. 1 is a flow diagram showing the initial route of the uttered command showing the allowance for the command to be for purposes of search, manipulation, and/or navigation.
Figure 2:
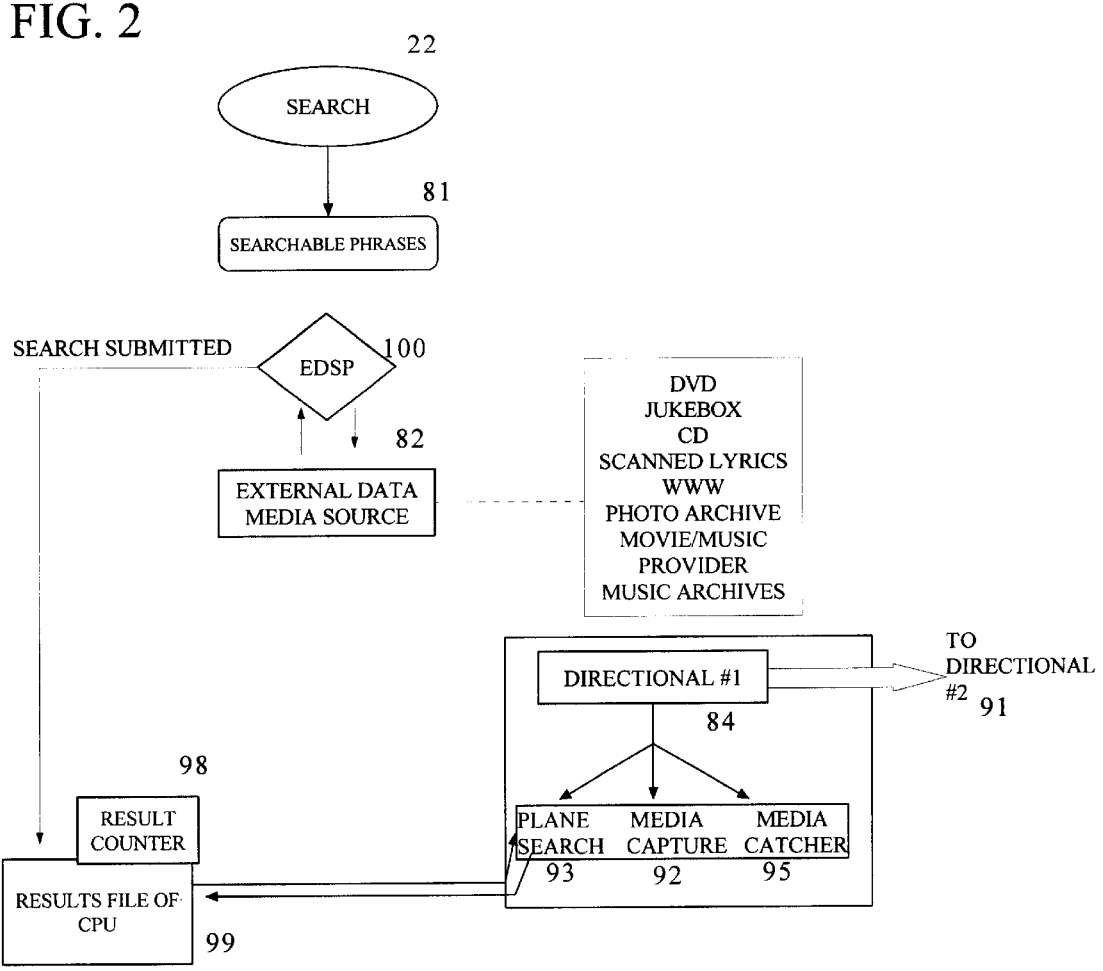
FIG. 2 is a flow diagram showing in detail the route of the initial activation of the search command to a first directional.
Figure 3:
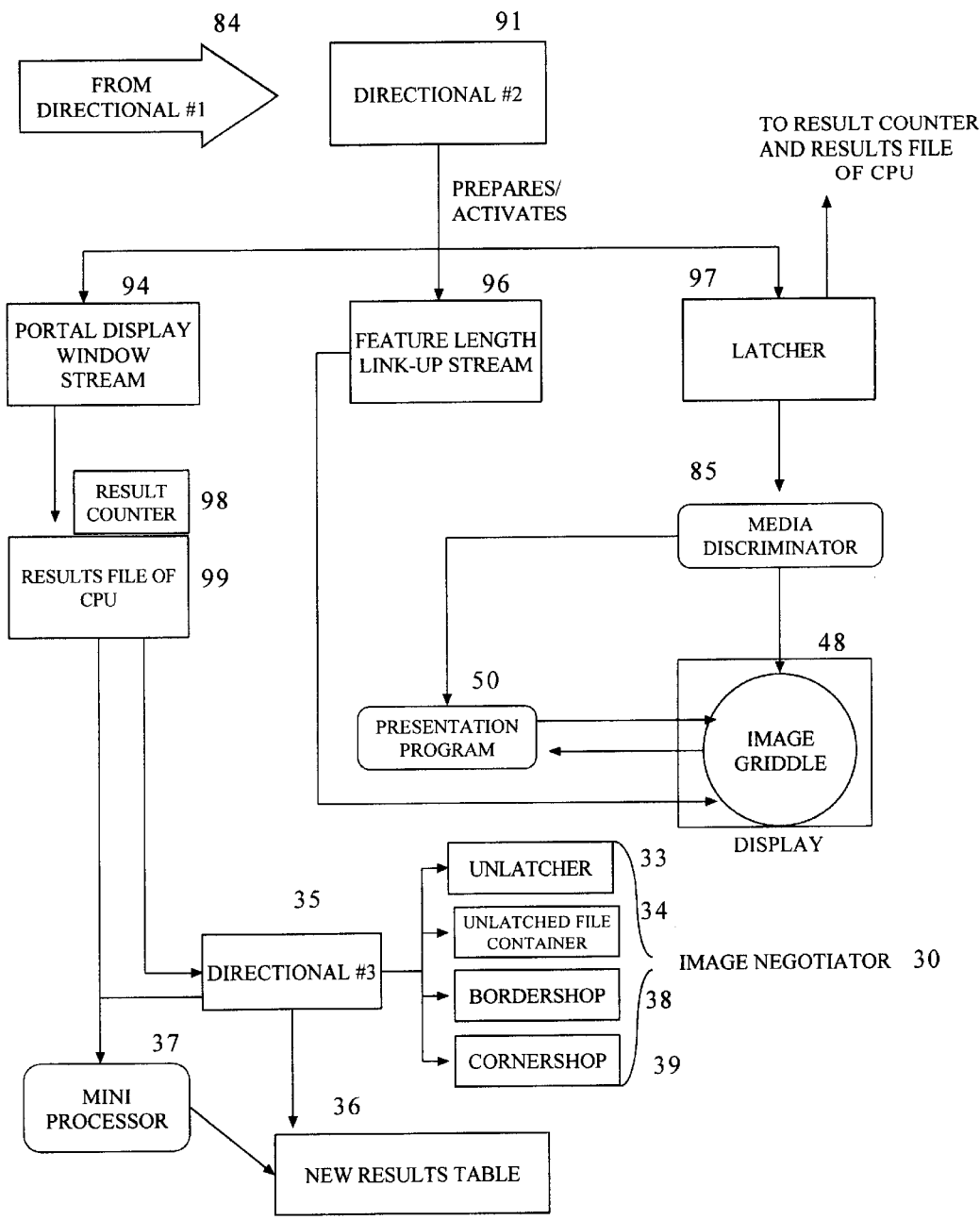
FIG. 3 is a flow diagram showing the continuation of the route for the search command after the first directional.
Figure 4:
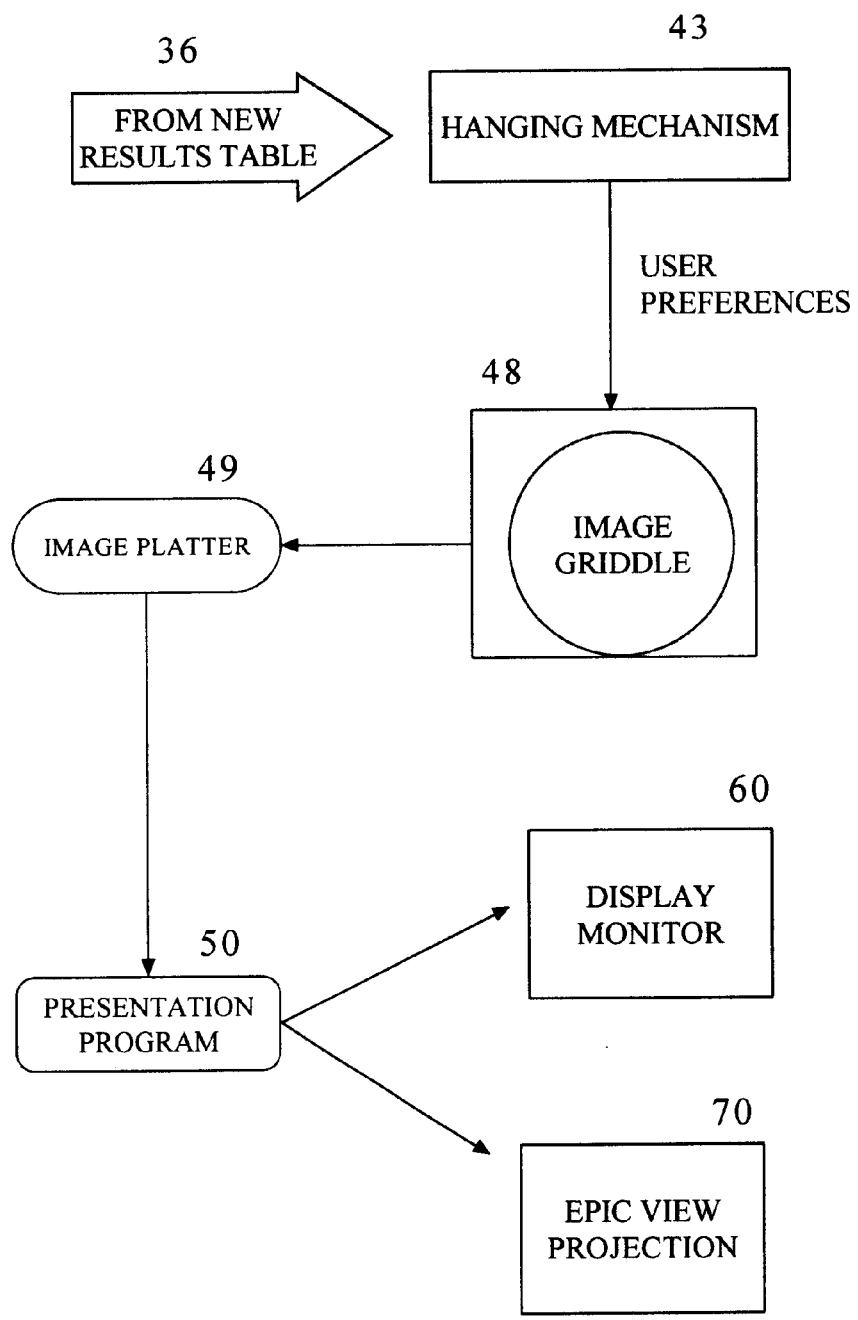
FIG. 4 is a flow diagram showing the continuation of the route for the search command after a third directional has formed a results table.

Starting with reference to FIG. 1, a command 10 is converted from voice to text by a voice-recognition module 21 being utilized by a computer, which distinguishes the nature of the utterance 20, and divides it into one of three categories: search 22, manipulation 24, or navigation 26. The utterance 20 can be inputted as a command 10 to the voice-recognition module 20 by any wire-or-wireless microphone, or by keyboard, where all words are converted to computer-readable text and key words. The utterance 20 may also be text pre-existing in the form of closed-captioned movies or scanned lyrics recorded into the system as further described. The keywords in any utterance 20 may include, and are not limited to, "find" for the search 22 command, "move", "zoom" or "play" for the manipulation 24 command, and "next", "back", "play", or "pause" for the navigation 26 command, any of which utterances 20 are based on pre-set user preferences With reference now to FIGS. 2—4, internally the search 22 command is sorted out and converted into searchable phrases 81, thereby identifying and confirming access to the necessary external data media sources 82. The external data media sources 82 also include all local media databases such as a local image base, or a local movie or music base. A movie base as termed herein in the present system includes a local DVD (digital video disc, or digital versatile disc) tower that utilizes closed captioning text, which is stored in the video stream as an MPEG file.

A music base termed herein refers to a local CD (compact disc) tower or jukebox tower, which utilizes in-house caption cataloging of detailed information with the possibility of utilizing scanned music lyric sheets. Closed-captions are meant to be a direct transcription of the audio part of a television broadcast signal into written words (text). Closed-caption text is directly related to the video stream, thus becoming possible to index video text through closed caption extraction.

The external data media sources 82 also include all remote image databases such as a photo archive, on-line digital image vendor, on-line news or geographic and weather resource, virtual movie or music provider, such as web TV and music MP3 archives. The connections to the media sources 82 are one of three: 1—local (in-house) ethernet connection; 2—a program temporarily installed on a computer's harddrive; and/or a connection via the World Wide Web (WWW) and any other computer network.

The external data media sources 82 are accessed by an external dynamic search platform filter (EDSP filter) 100. The EDSP filter 100 activates a first directional (directional #1) 84, while simultaneously having the search 22 commands issued therein, based on user preferences 1. The EDSP filter 100 is also used as a means for taking the converted search 22 command and submitting the search 22 after the relevant media sources 82 have been identified. Thus, the EDSP filter 100 accesses each media source and performs the various search, retrieve, and display functions in a variety of ways, based on the differences of the individual media source 82. This would have been pre-set in the user preferences 1 (FIG. 1) when a user is asked about which media sources 82 are to be accessed.

A directional is to be understood as a means for triggering other commands separately with time-delay or alongside one another, similar to a circuit as commands are branched elsewhere or paralleled within the computer.

Directional #1 84 is used as a means for activating the plane search 93, media capture 92, media catcher 95, and directional #2 91 while the search 22 is activated. The media capture 92, refers to the system downloader that "captures" each file to be downloaded into the media catcher 95, which would then contain the stabilized files based on user preferences. Within each EDSP filter 100, as the search 22 is submitted, the results will either be confirmed or denied (based on pre-set preferences), with the total result numbers from all media sources 82 showing in a results counter 98 of a results file 99 of the CPU.

As results in the results file 99 are confirmed, the processes from Directional #1 84 will perform a series of pre-set scripts, scanning the plane for desired media characteristics, via the plane search 93, which is a hybrid of word proximity and image size that searches for how close an image is based on a search query. Based on user preferences for which type of database is to be searched, such as the WWW or local CD/DVD jukebox, the plane search 93 scans the page or "window" after the results are posted. The user is then prompted for a "next page of results," a "results" or "submit" button, a link, and/or "full-scale images." Confirmation is detected by a timer, which defaults to a maximum-amount-of-time spent-per-search, and will capture/download/copy 92 the media item into a roving file of a media catcher 95. The media catcher 95 is used as a means for containing added results throughout the duration of the search. The roving file of the media catcher 95 is then sent and stored on the hard-drive of the local CPU results file 99.

While the search 22 is being submitted to the EDSP filter 100, Directional #2 91 prepares and activates the following modules, which are awaiting results 99: portal display window stream 94 for display of multi-media (i.e. text with images, web page); feature-length link-up stream 96 for long-play audio and video (movies); a latcher 97, which is a means for converting all non-long-play audio/video file results into workable media, and a new results file 99, which contains all of the latched files, back to the results file 99 to perform the necessary latching. A latcher 97 is a command, triggered by a directional 91, used as a means for accessing the results file 99 and performing a preliminary strip-down of all extraneous data that may have been sent with each individual media result, and which also separates any multi-images that may come back in clumps. The extraneous data includes ads or text that is included within or around the image that is to be deleted. The latcher 97 triggers the results counter 98 to await final results from the results file 99. Thus, the latcher 97 operates on the pre-set user preferences 1 that deal with what the user wants to disregard in terms of unnecessary text, tables, etc.

For non-latchable media, i.e. floating images or unidentifiable media, the results 99 are sent to the media discriminator 85, which is a means for detecting what type of file the results 99 are (wav, mov, ram, jpg, gif, tif, bitmap, etc.), and which then activates the image griddle 48 for prompt display as further described, while also activating the necessary presentation program 50 waiting for the image griddle 48.

Long-play media associated with the feature length link-up stream 96 is sent straight to the image griddle 48, while the remaining media (still images, short-play audio and video) undergoes further processing. This processing occurs as part of the portal display window stream 94 wherein a means is provided for the results file 99 to calculate the amount of results in the results counter 98, and send the amount of results from the results file 99 to a mini-processor 37 (internal processing file). The mini-processor is used as a means for creating a table 36 for the newly acquired results.

The results file 99 also simultaneously activates directional #3 35, which activates the mini-processor 37, and the components within the image negotiator 30-unlatcher 33, unlatched file container 34, bordershop 38, cornershop 39, and the table 36. The table 36 contains the media; each with active readable corners and borders having been recently attached as further described. Each individual object is lifted from the table 36 by the unlatcher 33 and called up into the unlatched file container 34 to be included into the table 36.

The table 36 then activates a hanging mechanism, or hanger 43, which implants each newly found (static) media onto the image griddle 48, in a manner based on pre-set user preferences. The hanger 43 is a command that is used as a means for moving each file from a cell within the table 36 onto the image griddle 48. It does this by recognizing the corners from the cornershop 39 and calculates the placement of each media to be hung onto a hook of the image griddle 48. Based on the user preferences, during the user's profile setup, the user is asked, "how many results displayed per screen per search result" and "which size for each." Based on both of these figures, a "center" hook is established for each media to correspond with the geometric center of each result as well as to provide adequate space in between each media result. Thus, the corners from the cornershop 39 are created by calculating the size (width and height) of the frame, and/or borders from the bordershop 38. The image griddle 48 contains these hooks, which are dispersed around a grid designed to correspond to pre-set user preferences, and which is a means for providing a monitoring platform whereon each new item is "hung" by having the corners and borders read by the hooks and grid.

The image negotiator 30 is a term used to describe the means for preparing the media for the image griddle 48, which is the stage where the media is vocally transformed based on the manipulation command 24. In other words, the image griddle 48 is the platform for a displayed product with hooks, borders, and frames so that a user can see a layout in a draft format and manually move it around in preparation for a planned event.

The new results 36 are also simulcast on an image platter 49, which is a means for providing a mirror image of the image griddle 48, without the hooks, grid, borders, and/or corners being visible. The view from the image platter 49 then goes to the presentation program 50 to seek out any presentation media it needs to run or display the media. The presentation program 50 is where graphics conversion programs and presentation software resides. This software may include any program known in the art that provides a visual display. This is the view seen on the local display monitor 60 and/or epic view projection 70. The epic view projection 70 is the final output, or the display the viewer sees on a monitor or digital projector projecting the manipulated media image seen on the local display onto a large display screen as further described. This output is capable of being recorded.

Figure 5:
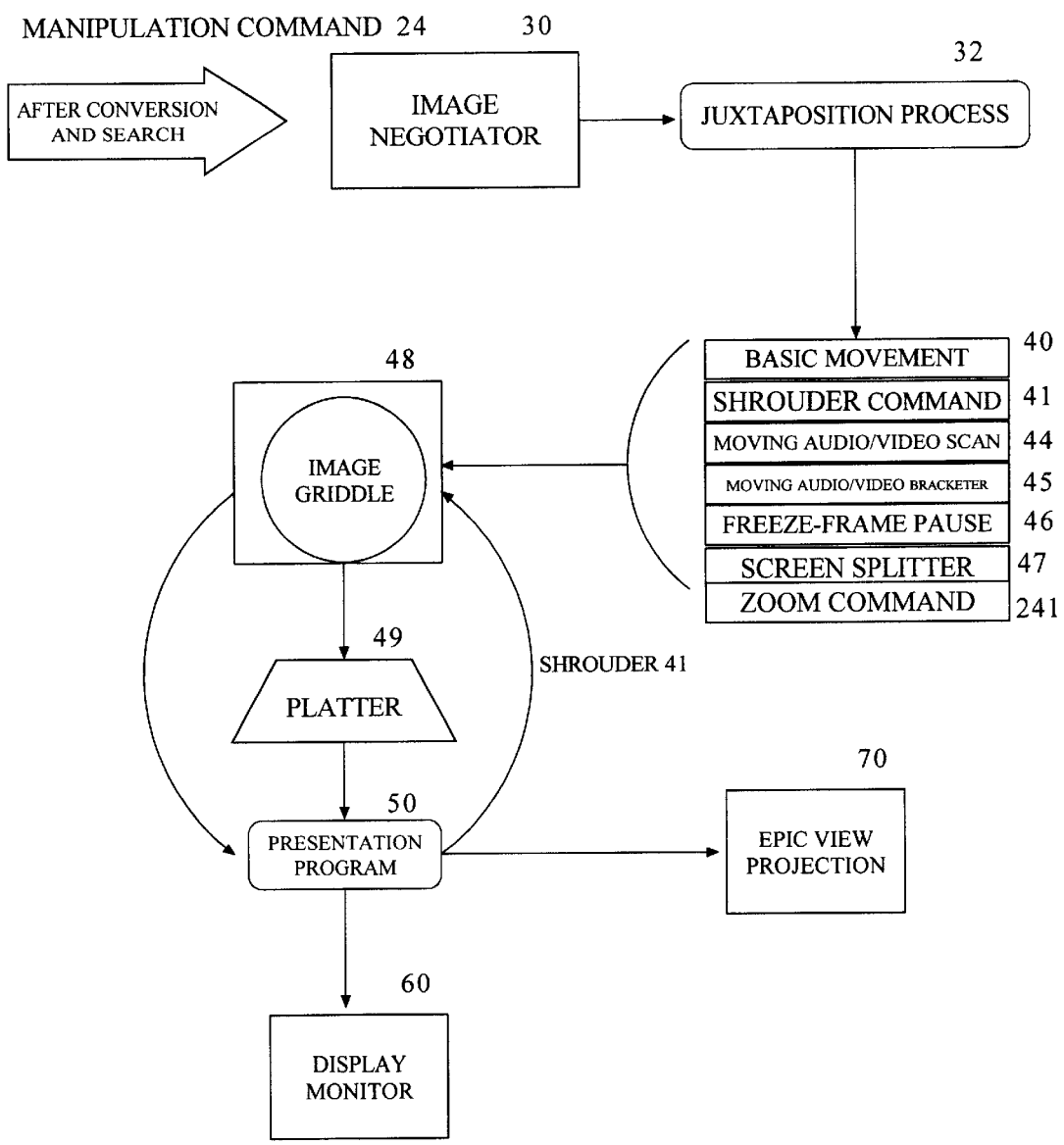
FIG. 5 is a flow diagram showing the route of the manipulation command after the conversion and search.

Now, with reference to FIG. 5, the manipulation 24 command, after being converted from voice-to-text, is identified and broken down by the image negotiator 30 into functional media juxtaposition commands, which are used as a means for activating a juxtaposition process 32. The juxtaposition process 32 within the image negotiator 30 is used as a means for performing one of the following to the media on the image griddle 48: basic movement (up-down-left-right) 40; shrouder command 41, which is a means for placing transparent foreground over re-proportioned background; moving audio/video scan 44-ff, rev; moving audio/video bracketer 45, which allows for hands-free editing by the "clipping" of the video at certain locations; freeze-frame/pause 46; the screen splitter 47, which opens up a dual screen; and a zoom command 241 for a zoom in/zoom out option.

The manipulation command 24 then goes to the image griddle 48, the image platter 49, the presentation program 50, the local display monitor 60 and /or the epic view projection 70.

The shrouder 41 is an advantageous media placement juxtaposition means that associates itself with two images-a foreground and a background, each of which require calibration. The background is copied and re-sized to fit the approximate dimensions of the foreground. The background is then "blurred", "muted", "paused", etc. depending on preferences or voice command. The foreground is then copied and regenerated as a "transparent" image (or frames if a movie) to be laid on top of the background. Unlike other juxtaposition means in the juxtaposition process 32, the shrouder 41 needs to go back at least once to the presentation program 50. Thus, the shrouder 41 will have to go back to the image griddle 48 after activation of presentation program 50 to have chosen foreground overlaid onto the chosen, re-proportioned background. The shrouder 41 will then go back to the presentation program 50, the local display monitor 60 and /or the epic view projection 70.

Figure 6:
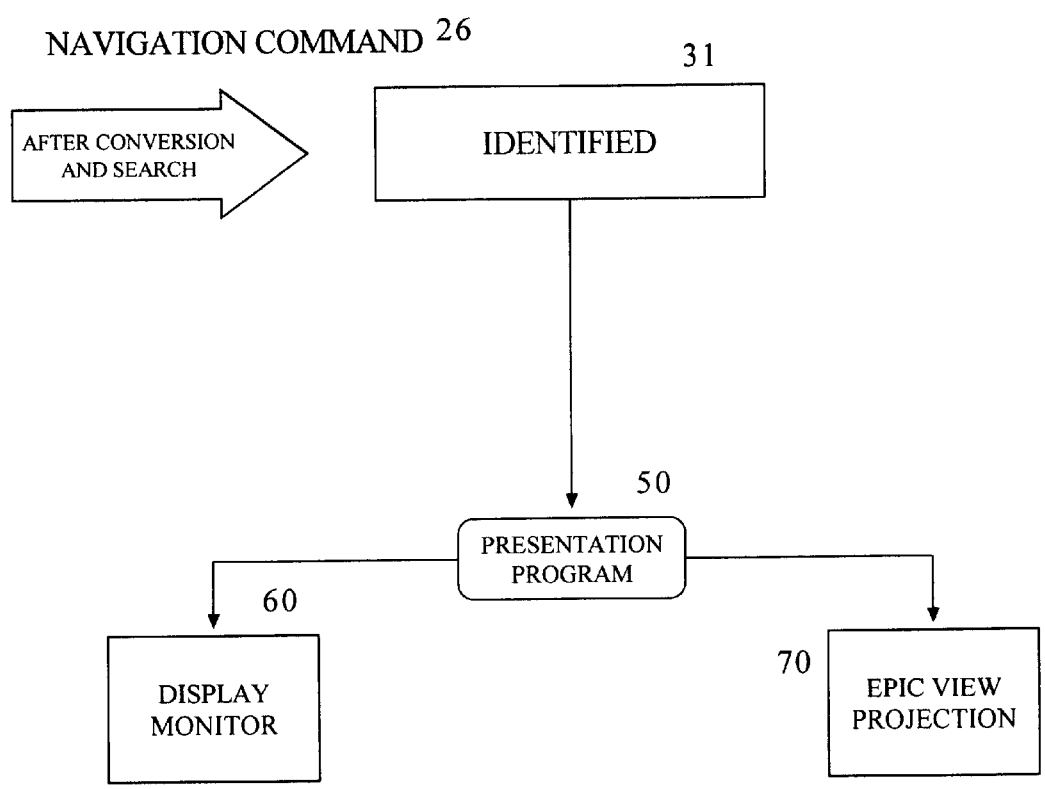
FIG. 6 is a flow diagram showing the route of the navigation command after the conversion and search.

Now, with reference to FIG. 6, the navigation command 26, after being converted, is identified 31 based on pre-set user preferences and then sent straight to the presentation program 50 to have the necessary navigation commands (next, back, play, stop, etc.) carried out. The navigation command 26 is activated based on the utterance that the user provides. The navigation commands 26 are only used for planned presentations. The navigation command 26 ultimately goes to the local display monitor 60 and /or the epic view projection 70.

Overall, with the interrelation of all of the commands and components as described above, the system can provide at least twenty options for a user, which are shown in the following table 1.

TABLE 1

User Options

1. Display planned presentation (without additions or screen adjustments)
2. Search for and display still image (within same screen)
3. Search for and display still image (as new screen)
4. Search for feature-length movie and display selected movie clip (same screen)
5. Search for feature-length movie and display selected movie clip (new/next screen)
6. Search for feature-length movie and display selected still image (same screen)
7. Search for feature-length movie and display selected still image (new/next screen)
8. Search for movie-clip and display edited, shorter clip (same screen)
9. Search for movie-clip and display edited, shorter clip (new/next screen)
10. Search for movie-clip and display selected still image (same screen)
11. Search for movie-clip and display selected still image (new/next screen)
12. Allow spontaneous placement of image, movie frame, or free-floating image
13. Overlay of free-floating transparent image onto re-proportioned current image
14. Calculates (and re-calculates for sporadic pauses) lengthy feature-length movie or slide show presentations and re-proportions the event with re-set time-limit perimeters
15. Search for audio track and play whole
16. Search for audio track, scan, sample, assemble, and play during other event
17. Data search: display results on one screen with "scroll" feature
18. Data search: display results on shared screen with "scroll" feature
19. Data search: display results as transparent overlay
20. Record event An illustrated example of the essential internal components of the system and their respective functions are diagrammatically illustrated in FIGS. 7–10.

Figure 7:
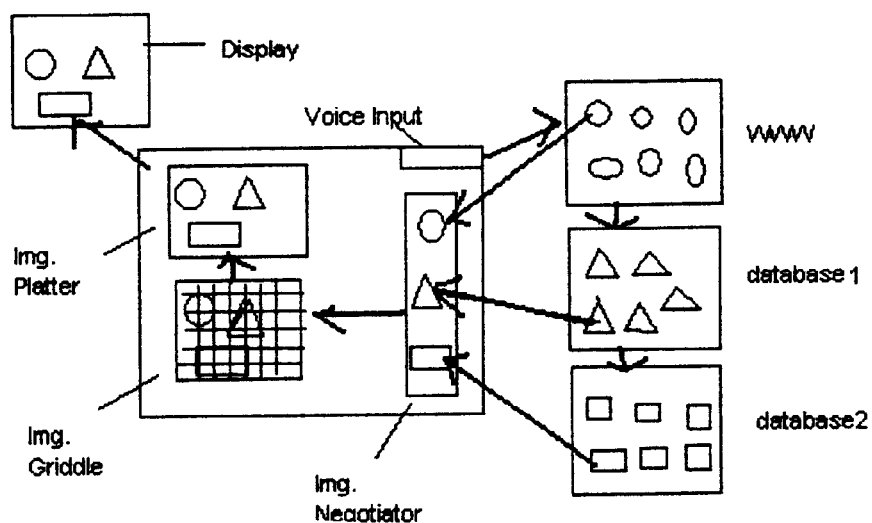
FIG. 7 is a diagrammatic illustration of the essential components and the function of the system as it would be used for an impromptu search and display of an image from red a plurality of databases.

FIG. 7 shows an impromptu image search and display. In this example there are three external media databases selected to be searched by the user, one of which is the WWW.

Figure 8:
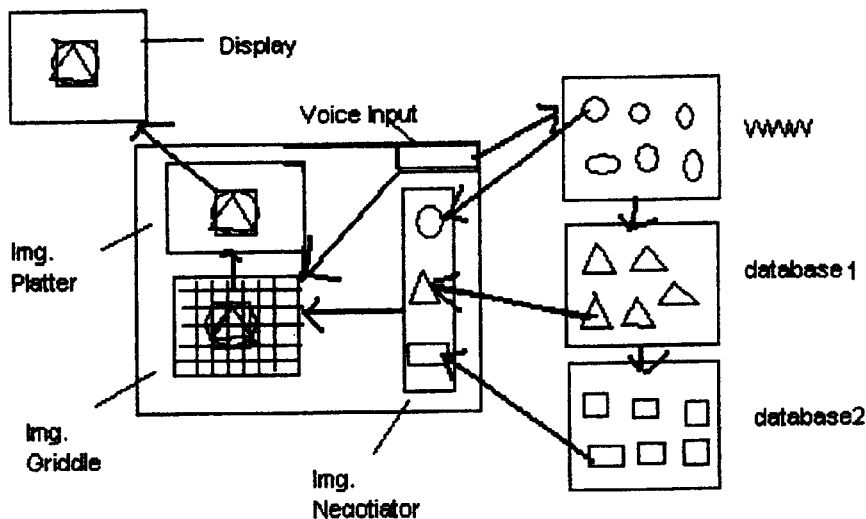
FIG. 8 is a diagrammatic illustration of the essential components and the function of the system as it would be used for an impromptu image overlay of a group of images searched and selected by a user from a plurality of databases.

The image negotiator is used as a means for identifying and retrieving the media selected based on voice input by the user, and, in the process, juxtaposes the media to prepare the image, audio, text, etc. for issuance to the image griddle. The image griddle is the platform used as a means for arranging the images for a presentation. The images to be presented are then, viewed in the image platter, which is used as a means for allowing a preliminary display of the image without the grid being seen behind the image of the image griddle before presentation. As seen in FIG. 8, the shrouder command allows the images to be overlaid within the image griddle as described above.

With reference now to FIG. 9, more than one image can also be selected, and the images initially presented on the image griddle by the image negotiator can be manipulated. In this example, the user selects to see two images and asks to zoom-in on the left image by the command "zoom left". The image on the right can also be moved to the upper right-hand corner of the display by commanding "move right, up, up, right" etc. Each of the views is then seen in the image platter.

FIG. 10 is an example of the results table formed by directional #3 and the mini-processor. Ten results are shown, and the user selects to see two results per screen, whereby the first two images are hung onto the image griddle by the hanging command. In this example, the borders and corners are active allowing for a means of further manipulating the selected images.

Filter Program Utilizing Closed Captioning From DVD and/or Scanned Music Lyric Sheets The EDSP filter records the movie or song in conjunction with the voice-recognition module, which recognizes the text. The EDSP filter filters text that runs alongside moving images and sounds. It consolidates both streams into one stream, which then consists of frames with time-stamped words searched later via voice command. Termed as a live indexed field alignment, each word is detected as a "type" and then the field "types" list is activated. Thus, the EDSP filter seeks out, any possible indexing match-ups on the server-end and catalogs it as local media. This occurs when a search is conveyed and a positive result is posted through the EDSP filter. Unless the media is fully indexed, i.e. movie scripts and song lyrics, remote media transmission can only have "basic search" performed because if there are no pre-stored closed captioning stored in a remote movie stream, the search action is directed to basic search action. The live indexed filed alignment recommended or required search fields include:

A—tile/menu/play-list guide

B—cc caption stream

C—single field
 full script
 Keyword
 Title
 Subject
 Date
 Character personal name
 Cast personal name For lyric sheets or movie scripts, OCRd (optical character recognized) text from separately scanned lyric sheets or movie scripts are ran alongside the consolidate stream (as above) and "matched" with similar corresponding words and/or phrases and automatically determined to override any previous undecipherable words and/or phrases during initial download. Then both streams are again consolidated into one stream, which consists of frames with time-stamped words that can be searched later via voice command.

Remotely, a play-list manager will allow the user to create and maintain multiple play lists. The recommended or required search fields are as follows:

A—menu/play-list guide

B—scanned lyrics

C—single field
 full lyrics
 keyword
 title
 subject
 date
 artist/group personal name
 production personal name
 physical description (material, length)

D—label (descriptive paragraph/abstract)

I claim:

1. A system utilizing a computer for enabling a user to vocally assemble, manipulate, and display a plurality of media searched and retrieved from variable external data media sources based on preferences of said user, comprising:

a voice recognition module working in conjunction with said computer for converting an inputted voice utterance into computer-readable text in the form of a plurality of search commands, manipulation commands, and navigation commands;

filtering means for taking said search commands after such conversion by said voice-recognition means and identifying one of said external data media sources for committing and retrieving said media;

juxtapositioning means for preparing said media after such retrieving by said filtering means for local display;

platform means whereon said media is vocally manipulated and organized based on each of said manipulation commands performed by said user after such preparing from said juxtapositioning means; and, means for providing a mirror image of said media after such manipulation and organization as a preliminary view before an epic view projection of said media wherein said epic view projection utilizes each of said navigation commands as part of a presentation program.

2. The system of claim 1, wherein said media includes text, audio, still images, movies, and on-line resources.

3. The system of claim 2, wherein said text is closed captioned text from each of said movies.

4. The system of claim 2, wherein said text is text from scanned music lyric sheets.

5. The system of claim 1, wherein said external data media sources include a plurality of both local and remote databases.

6. The system of claim 5, wherein said local database is a DVD tower.

7. The system of claim 5, wherein said local database is a CD tower.

8. The system of claim 5, wherein said local database is a jukebox tower.

9. The system of claim 5, wherein said remote database is a virtual movie provider.

10. The system of claim 5, wherein said remote database is a music provider.

11. The system of claim 10, wherein said music provider is an MP3 archive.

12. The system of claim 1, wherein said platform means further comprises hooks dispersed around a grid whereon said media is hung by having corners and borders of said media read by said hooks and said grid.

13. A system utilizing a computer for enabling a user to vocally assemble and display a plurality of media searched and retrieved from variable external data media sources and manipulated based on preferences of said user, comprising:

a voice recognition module working in conjunction with said computer for converting an inputted voice utterance into computer-readable text in the form of a plurality of search commands, manipulation commands, and navigation commands;

filtering means for taking each of said search commands after such conversion by said voice-recognition means and identifying one of said external data media sources for committing and retrieving said media in the form of search results, said filtering means further comprising a first directional means for activating each of a plane search, a media capture, and a second directional means;

a results file having a results counter;

means for providing that said results file calculate an amount of said search results produced by said search command performed by said user for said media;

means for creating a table for said search results;

platform means for allowing said user to see a layout of said media after said search results are retrieved from said external data media sources;

means for moving each of said search results independently out of said table onto said platform means;

means for activating a juxtaposition process to allow each of said manipulation commands to be performed by said user on said search results after such removal out of said table onto said platform means; and, means for providing a mirror image of said media after said manipulation commands are performed as a preliminary view before an epic view projection of said media, wherein said epic view projection utilizes said navigation commands as part of a presentation program.

14. The system of claim 13, wherein said plane search identifies how close each of said media are relative to each of said search commands based on word proximity and image size inputted by said user.

15. The system of claim 13, wherein said media capture is a downloader for each of said result files.

16. The system of claim 13, wherein said second directional means prepares and activates a portal display window stream for a display of text with images.

17. The system of claim 16, wherein said display of text with images is a web page.

18. The system of claim 13, wherein said second directional means prepares and activates a feature-length link-up stream for a display of long-play audio and video.

19. The system of claim 18, wherein said long-play audio and video is a soundtrack and movie.

20. The system of claim 13, wherein said second directional means prepares and activates a latching means for performing a strip-down of extraneous data sent with each of said search results to said results file.

21. The system of claim 13, wherein one of said manipulation commands is a shrouder command wherein a background image retrieved as said media based on said preferences is copied and re-sized to fit approximate dimensions of a retrieved foreground image.

22. The system of claim 13, wherein one of said manipulation commands is a basic movement command.

23. The system of claim 13, wherein one of said manipulation commands allows said user to clip videos.

24. The system of claim 13, wherein one of said manipulation commands is a screen splitter command.

25. The system of claim 13, wherein one of said manipulation commands is a zoom command.

26. A method in a computer for vocally assembling, manipulating, and displaying a plurality of media searched and retrieved from variable external data media sources based on preferences of said user, comprising the steps of:

categorizing a command converted from voice to text as a search command, manipulation command, or navigation command;

filtering said search command to allow access to each of said external data media sources based on said preferences of said user;

identifying each of said media relevant to said search command;

retrieving said media;

preparing said media for a vocal transformation based on said manipulation command on a platform having implemented therein a plurality of hooks on a grid whereon said media is hung having active corners and borders;

simulcasting said media on a local display;

outputting said media onto an epic display; and assembling said media based on each of said navigation commands.

27. The method of claim 26, wherein for the step of filtering said search command, multiple directionals are simultaneously performing a series of pre-set scripts for a desired characteristic of said media.

28. The method of claim 26, wherein after the step of retrieving said media, said media is stored in a results file.

29. The method of claim 28, wherein said results file is accessed by a latcher command, said latcher command strips down any extraneous data included within or around said media based on said preferences of said user.

30. The method of claim 29, wherein said extraneous data is an advertisement.

31. The method of claim 29, wherein said extraneous data is text.

32. The method of claim 26, wherein the step of preparing said media further comprises the steps of:

organizing said media in a table created by a miniprocessor; and, moving said media from said table onto said platform using a hanging command, wherein said hanging command calculates a placement of said media onto each of said hooks.

33. The method of claim 26, wherein said vocal transformation from said manipulation command includes at least one of the following performed on said media by said user: moving said media up, down, left, or right; placing a transparent foreground over a re-proportioned background; clipping said media; pausing said media; opening up a dual screen; and zooming in or out.

34. The method of claim 26, wherein after the step of assembling said media, said user can record said outputting of said media.

* * * * *